Patented Oct. 19, 1943

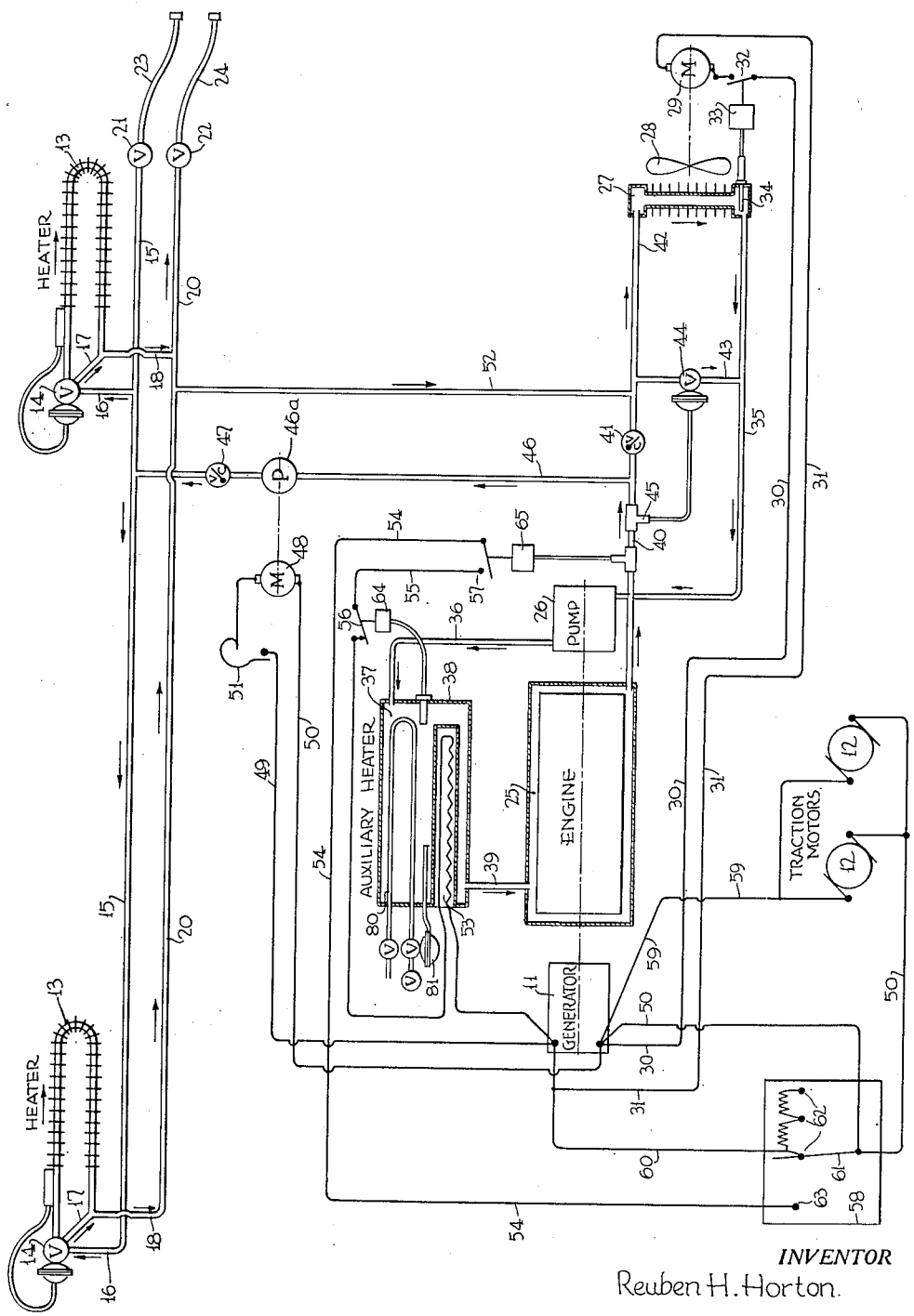

2,332,149

UNITED STATES PATENT OFFICE 2,332,149

VEHICLE HEATING SYSTEM

Reuben H. Horton, Philadelphia, Pa., assignor to Edward G. Budd Manufacturing Company, Philadelphia, Pa., a corporation of Pennsylvania Application May 15, 1942, Serial No. 443,157

10 Claims. (Cl. 290—2)

This invention relates to heating systems, more particularly to heating systems for railway coaches and the like.

It has been proposed heretofore, particularly with respect to trains propelled by Diesel engines to utilize the waste heat of the engines as a source of heat for heating the coaches or, at least, to utilize the waste heat as a partial source. There are times, however, in the operation of Diesel-powered trains, such as at station stops, or on sidings when the engines are running at idling speeds and under no load, that the heating value of the waste heat is inadequate to maintain the temperature in the coaches at the desired value.

Accordingly, one of the objects of the present invention is to overcome these difficulties and provide a means under the conditions set forth above for increasing the heating value of the waste heat.

Another object is to provide a heating system of this character wherein the source of increasing the heating value of the waste heat is dependent upon and responsive to the idling condition of the engines.

Another object is to provide such a system using the engine jacket water for heating wherein under an idling condition only of the engines, the heating value of the jacket water is increased by the use of an electric resistance heater in the jacket water which derives its electrical energy from a generator driven by the engines.

A further object is to provide such a system wherein the resistance heater is ineffective to heat the jacket water during the supply of energy to the traction motors.

A still further object is to provide a system in which improved means is provided for warming up the engine after a stand-by period.

With the above and other objects in view, which will be apparent from the following detailed description, the present invention consists of certain features and combinations of parts to be hereinafter described with reference to the accompanying drawing and then claimed.

In the drawing there is illustrated a schematic view of the system showing the general arrangement of parts and their association with each other, including the piping and wiring diagrams therefor. Referring to the accompanying drawing, the heating system of the present invention is schematically illustrated in a simplified form in order to present a clear showing, it being understood that the invention is directed to the system rather than to detail features of construction of the various parts comprising the same. The heating system is applicable to a railway propulsion system having one or more Diesel or other internal combustion engines 10 which drive generating equipment 11 for the supply of electrical energy to the traction motors 12 and for the control and other equipment, as is conventional practice. It is well understood that in such a system the load imposed on the electrical generating equipment by the traction motors places a materially increased load on the engines. This increased load results in heating up of the engines and a greater transfer of heat to the circulating cooling water. Consequently the temperature of the cooling water leaving the engines is materially increased. This, of course, is waste heat and under the normal operating conditions of the engines under load is sufficient to heat the coaches of at least short trains of three or four cars. However, when the load on the generators created by the traction motors is removed, such as for example when the train is stationary, as at staiton stops and the engines are running at idling speed, the temperature of the cooling water very materially drops after a short period of time, thus making less jacket water heat, that is, waste heat available for heating purposes.

In accordance with the present invention, I compensate for this loss in jacket water heat by providing an auxiliary heater for the engine jacket water, the source of heat being electrical energy generated by the generating equipment which source is only brought into play to add heat to the jacket water when the engines are running at idling speed, but only when the temperature of the jacket water drops below a predetermined low temperature, as will be hereinafter described, the predetermined low temperature being that which is inadequate to provide the desired heating.

The car containing Diesel electric equipment, and the other cars of a particular train may be heated by any desired number of side or bottom heaters 13 through which the heated jacket water circulates, the heaters 13 receiving the hot jacket water from a main conduit 15 extending the length of the car in question. The conduit 15 is connected with the heater 13 by means of a conduit 16. The water which circulates through the heaters 13 is returned through conduit 18 to a main conduit 20 also extending the length of the car in question. The conduits 15 and 20 are provided with shut-off valves 21 and 22 respectively and with flexible connections 23 and 24, respectively, for connection with corresponding main conduits of a following car of the train, as is conventional practice.

The heaters 13 may be provided with any suitable control means such as the thermostatic valves 14 for by-passing the circulating water through conduits 17 to the main conduit 20 when there is no demand for heating.

The internal combustion engine 10 is provided with a water circulating jacket diagrammatically illustrated at 25, a circulating pump 26 and a cooling system including a heat transfer radiator 27 over which air is circulated in heat transfer relation by a fan 28 driven by an electric motor 29. The motor 29 is connected through conductors 30 and 31 with the generating equipment 11. In order to control the operation of the fan 28, the switch 32 is arranged in the conductor 30 to be actuated by a thermostatic device 33 having its actuating bulb 34 immersed in the water in the radiator 27 and responsive to the temperature of such water.

The pump 26, which is driven by the engine 10, draws water from the radiator 27 through conduit 35 and discharges the same under pressure through conduit 36 to a water chamber 37 of the auxiliary heater 38 from whence the water is forced through conduit 39 to the engine jacket 25. The heated water, which has cooled the engine, leaves the water jacket 25 through conduit 40 and flows past the check valve 41 and through conduit 42 to the radiator 27.

Connected across the conduits 35 and 41 is a by-pass conduit 43 having a thermostatic valve 44 therein, the thermostatic bulb 45 thereof being of the immersion type and arranged in conduit 40 to be responsive to the temperature of the water leaving the engine 10 whereby the water, if below the desired temperature, may be by-passed around the radiator 27 to the pump 26.

Connected with the conduit 40, ahead of the check valve 41 is a heating conduit 46 having a pump 46a and a check valve 47 therein to direct from the conduit 40 and conduct the hot jacket water to the main car conduit 15 when there is a demand for heat. The pump 46a is driven by an electric motor 48 having its circuit connections 49 and 50 connected with the generating equipment 11, a space thermostat 51 being arranged in one of the circuit connections 49 and 50. The thermostat 51 is responsive to the temperature of the air within the particular coach in which the heaters 13 are located so that when there is a demand for heat, the thermostat will close and start the pump 46a in operation to circulate hot water to the car feed conduit 15 for supplying the hot water to the heaters 13. The water which circulates through the heaters 13 or by-passed around the heaters, returns from the main conduit 20 through conduit 52 to the conduit 42 at a point beyond the check valve 41.

Under normal operating conditions, that is, when the traction motors 12 are propelling the train and thus imposing a load on the engine 10, the waste heat of the jacket water of the engine is sufficient to effectively heat the heaters 13 and thus provide adequate heat for the particular coach or coaches, as the case may be, when there is a demand for heating. The jacket water leaving the engine 10 under load conditions is at a temperature of for example over 180° F. and is sufficient for heating the cars to the desired temperature.

Frequently, in cold weather operation and when the engines are running at idling speed, that is, no load being imposed thereon by traction motors, the temperature of the jacket water may drop well below 180° F. to a temperature which is insufficient for adequate heating. This frequently occurs during stand-by periods and during prolonged station stops.

In accordance with the present invention, a means is provided in the water chamber 37 of the auxiliary heater 38 to raise the temperature of the water entering the engine 10 to the desired degree for adequate heating. To this end, an electric resistance heater 53 of the immersion type is provided within the water chamber 37 and has circuit connections 54 and 55 with the generating equipment 11. A resistance heater 53 is controlled by switches 56 and 57 and the controller 58 for the traction motors 12. The traction motors are in a circuit 59—60 through the controller 58 with the generating equipment 11, the controller having a movable contact lever 61, traction motor contacts 62 and a contact 63. As seen in the drawing, contact 63, which is in the line 49, can only be closed by the controller lever 61 to close the resistance heater circuit 49 and 50. When the lever 61 is in open contact position with respect to the traction motor contacts 62, it is thus seen that the resistance heater 53 can only be energized from generating equipment 11 when the controller lever 61 is in its "off" position to close contact 63. At this position of the lever 61, traction motors 12 are disconnected from the generating equipment. This is a condition which exists when the engine 10 is idling, as at a station stop.

Assuming that the engine is idling, contact 63 is closed by the controller lever 61 and switch 56 is closed, it normally being closed and openable by a thermostatic device 64 responsive to an excessively high temperature of the water in chamber 37, if the temperature of the jacket water leaving the engine 10 drops below a desired degree, such as for example 180° F., switch 57 closes by the operation of a thermostatic device 65 which is responsive to a predetermined low temperature of the water in the conduit 40. Under these conditions, closure of the switch 57 establishes the circuit which energizes the resistance heater 53 from the generating equipment 11 whereby the heater will heat the water in chamber 37 to whatever temperature is desired. The thermostatic device 64 may be set to open the switch 56 to de-energize the heater 53 when the water reaches a desired maximum temperature such as for example a temperature of 185° or 190° F. It is to be understood that device 64 opens switch 56 on rising water temperature and device 65 opens switch 57 on a dropping water temperature, and that the switches 56 and 57 may be set for whatever water temperature is suitable for most practical operation. It is also to be understood that the switch 56 and its thermostat device 64 may be eliminated and the thermostat 65 set to open switch 57 at whatever temperature is desired.

Briefly, throwing the controller lever 61 to "off" position stops traction motors 12 and closes contact 33, whereby during idling of the engines, if the water temperature becomes too low for adequate car heating, switch 65 closes to set the resistance heater 53 in operation. Upon the water in chamber 37 reaching the desired maximum temperature, switch 56 opens to thus prevent excessive heating of the jacket water. If, before the switch 56 opens, the controller lever 61 is thrown to close one of the contacts 62 to start the traction motors the heater 53 is de-energized.

There thus is provided an efficient means for insuring that the jacket water will be heated to a temperature suitable for adequate car heating when the engines are idling and under no load.

Another advantage of the resistance heater is that it provides for rapid heating of the jacket water when the engines are being started from a cold condition and eliminates a long delay in getting the engines up to an efficient operating temperature.

During stand-by periods, when the engines are not in operation, I have provided a steam coil heater 80 immersed in the water in the auxiliary heater 37, which may be connected with yard steam connections, to keep the water in the chamber 37 heated to any desired temperature for facilitating starting of the engines in cold weather and to eliminate long warming up periods. The coil heater 80 may be controlled by a suitable thermostatic valve 81 responsive to the temperature of the water in the chamber 37.

It is to be understood that the various valves, control devices and the like may be arranged at locations other than those shown on the drawing and that various other arrangements of the parts may be made without departing from the spirit of the invention, the scope of which is defined by the appended claims.

What is claimed is:

1. In a vehicle having electric propulsion motors, a generator for supplying electric energy to said motors and an internal combustion engine for driving said generator, said engine having a water jacket in heat exchange relation therewith and provided with inlet and outlet connections, a closed circuit heating system for the vehicle adapted to utilize the jacket water of the engine as the heating medium, said system including a fluid type heat transfer device having an inlet for receiving heated jacket water directly and solely from said outlet connection and an outlet from which the water is delivered therefrom to said inlet connection, an auxiliary electric water heating means for heating the jacket water after its passage through said heat transfer device and before its entrance to said jacket through said inlet connection, an electric circuit connecting said heating means and generator whereby said heating means may be energized by said generator, said circuit including a switch, and means responsive to a predetermined low temperature of the jacket water for actuating said switch to close said circuit whereby to energize said circuit to heat the jacket.

2. In a vehicle having electric propulsion motors, a generator for supplying electric energy to said motors and an internal combustion engine for driving said generator, said engine having a water jacket in heat exchange relation therewith and provided with inlet and outlet connections, a closed circuit heating system for the vehicle adapted to utilize the jacket water of the engine as the heating medium, said system including a jacket water circulating system having a vehicle heating radiator connected with said inlet and outlet connections, and a circulating pump intermediate said outlet connection and heating radiator, said radiator receiving heated jacket water solely from said jacket, an auxiliary electric water heating means intermediate said heating radiator and inlet connection, an electric circuit connecting said heating means and generator whereby said heating means may be energized by said generator, said circuit including a switch, means responsive to a predetermined low temperature of the jacket water for actuating said switch to close said circuit whereby to energize said circuit to heat the jacket water, and a controller having an on and off position for controlling the supply of energy from said generator to said propulsion motors, said circuit including a second switch closable only by said controller in the off position thereof, whereby to prevent energization of said circuit and heating means during the supply of energy to said propulsion motors.

3. In a vehicle having electric propulsion motors, a generator for supplying electric energy to said motors and an internal combustion engine for driving said generator, said engine having a water jacket in heat exchange relation therewith and provided with inlet and outlet connections, a closed circuit heating system for the vehicle adapted to utilize the jacket water of the engine as the heating medium, said system including a fluid type heat transfer device in the vehicle space to be heated and connected with said inlet and outlet connections and arranged to receive jacket water solely from said inlet connection, an auxiliary electric water heating means for heating the jacket water, an electric circuit connecting said heating means and generator whereby said heating means may be energized by said generator, said circuit including a switch, and means responsive to a predetermined low temperature of the jacket water for actuating said switch to close said circuit whereby to energize said circuit to heat the jacket water, said heating means being located in said circulating system at a region to heat the water therein flowing from said heat transfer device to said water jacket, and said temperature responsive means being located in said system at a region to be responsive to the temperature of the water flowing from said water jacket.

4. In a vehicle having electric propulsion motors, a generator for supplying electric energy to said motors and an internal combustion engine for driving said generator, said engine having a water jacket in heat exchange relation therewith and provided with inlet and outlet connections, a heating system for the vehicle adapted to utilize the jacket water of the engine as the heating medium, said system including a jacket water circulating system connected with said inlet and outlet connections, and including an auxiliary chamber through which the water circulates to said water jacket, an auxiliary electric water heating means in heat exchange relation with the water in said chamber, an electric circuit connecting said heating means and generator for energization of said heating means by said generator and including a switch, and means responsive to a predetermined low temperature of the jacket water flowing from said water jacket for actuating said switch to close said circuit for energization of said heating means by said generator whereby to heat the water in said chamber.

5. In a vehicle having electric propulson motors, a generator for supplying electric energy to said motors and an internal combustion engine for driving said generator, said engine having a water jacket in heat exchange relation therewith and having an idling speed during which said generator is disconnected from said motors and a driving speed during which said generator is connected with said motors to supply electric energy thereto, a water circulating system connected with said water jacket for circulating water therethrough, an electric resistance heater in heat exchange relation with the water in said system for heating the water entering said jacket, an electric circuit connecting said heater and generator for energizing said heater from said generator and including a switch for opening and closing the same, means for actuating said switch to close said circuit in response to a predetermined low temperature of the engine jacket water, and a second switch in series with said first switch for closing said circuit in response to idling speed only of said engine.

6. In a vehicle having electric propulsion motors, a generator for supplying electric energy to said motors and an internal combustion engine for driving said generator, said engine having a water jacket in heat exchange relation therewith, and provided with inlet and outlet connections, a heating system for the vehicle adapted to utilize the jacket water of the engine as the heating medium, said system including a jacket water circulating system connected with said inlet and outlet connections, an auxiliary electric water heating means for heating the jacket water, an electric circuit connecting said heating means and generator whereby said heating means may be energized by said generator, said circuit including a switch, and means responsive to a predetermined low temperature of the jacket water for actuating said switch to close said circuit whereby to energize said circuit to heat the jacket water, said circulating system including at least one heater for heating the vehicle, a pump for circulating jacket water to said heater, an electric motor for driving said pump and deriving its electric energy from said generator, and means responsive to the temperature within said vehicle for controlling said pump motor.

7. In a vehicle having electric propulsion motors, a generator for supplying electric energy to said motors and an internal combustion engine for driving said generator, said engine having a water jacket in heat exchange relation therewith and provided with inlet and outlet connections, a combined cooling system for the engine jacket water and heating system for the vehicle adapted to utilize the jacket water as the vehicle heating medium including a radiator having feed and discharge conduits connected with said outlet and inlet connections respectively, a heat interchange device within the vehicle for heating the same having a supply conduit connected with said feed conduit for directing jacket water from said feed conduit, an electric heater associated with said discharge conduit for heating the water flowing therein to said water jacket, means responsive to a predetermined low temperature of the jacket water for connecting said heater with said generator for energization thereby in the event the jacket water drops below a predetermined low temperature, and means for rendering said temperature responsive means ineffective to connect said heater and generator during the supply of electric energy to said motors.

8. In a vehicle having electric propulsion motors, a generator for supplying electric energy to said motors and an internal combustion engine for driving said generator, said engine having a water jacket in heat exchange relation therewith and provided with inlet and outlet connections, a combined cooling system for the engine jacket water and heating system for the vehicle adapted to utilize the jacket water as the vehicle heating medium including a radiator having feed and discharge conduits connected with said outlet and inlet connections respectively, a heat interchange device within the vehicle for heating the same having a supply conduit connected with said feed conduit for directing jacket water from said feed conduit, an electric heater associated with said discharge conduit for heating the water flowing therein to said water jacket, means responsive to a predetermined low temperature of the jacket water for connecting said heater with said generator for energization thereby in the event the jacket water drops below a predetermined low temperature, and means for rendering said temperature responsive means ineffective to connect said heater and generator during the supply of electric energy to said motors, said supply conduit having a pump associated therewith for directing water from said feed conduit to said heat interchange device, said pump being operatively responsive to a predetermined temperature condition within the vehicle.

9. In a vehicle having electric propulsion motors, a generator for supplying electric energy to said motors and an internal combustion engine for driving said generator, said engine having a water jacket in heat exchange relation therewith and provided with inlet and outlet connections, a combined cooling system for the engine jacket water and heating system for the vehicle adapted to utilize the jacket water as the vehicle heating medium including a radiator having feed and discharge conduits connected with said outlet and inlet connections respectively, a heat interchange device within the vehicle for heating the same having a supply conduit connected with said feed conduit for directing jacket water from said feed conduit, an electric heater associated with said discharge conduit for heating the water flowing therein to said water jacket, means responsive to a predetermined low temperature of the jacket water for connecting said heater with said generator for energization thereby in the event the jacket water drops below a predetermined low temperature, a controller for connecting said traction motors with and disconnecting said traction motors from said generator, and means associated with said controller and responsive to the motor-generator connected condition thereof for rendering said temperature responsive means ineffective to connect said heater and generator.

10. In a vehicle having electric propulsion motors, a generator for supplying electric energy to said motors and an internal combustion engine for driving said generator, said engine having a water jacket in heat exchange relation therewith and provided with inlet and outlet connections, a closed circuit heating system for the vehicle adapted to utilize the jacket water of the engine as the heating medium, said system including a jacket water circulating system connected with said inlet and outlet connections, an auxiliary heater for heating the jacket water immediately prior to its flow to said water jacket through said inlet connection in the event the temperature thereof falls below a predetermined value, said engine having an idling condition during which said generator is disconnected from said propulsion motors and an operating condition during which said generator is connected to said propulsion motors for supplying electric energy thereto, and means responsive to said idling condition only upon a predetermined low temperature of the jacket water leaving said water jacket for energizing said heater to heat the jacket water and being responsive to said operating condition to de-energize said heater.

REUBEN H. HORTON.